United States Patent
Smeltz et al.

(10) Patent No.: US 10,680,259 B2
(45) Date of Patent: Jun. 9, 2020

(54) REGENERATION OF FLOW BATTERY ELECTRODE

(71) Applicant: United Technologies Corporation, Farmington, CT (US)

(72) Inventors: Andrew Smeltz, Manchester, CT (US); Michael L. Perry, Glastonbury, CT (US); Robert Mason Darling, South Windsor, CT (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 390 days.

(21) Appl. No.: 15/511,030

(22) PCT Filed: Sep. 15, 2014

(86) PCT No.: PCT/US2014/055565
§ 371 (c)(1),
(2) Date: Mar. 14, 2017

(87) PCT Pub. No.: WO2016/043692
PCT Pub. Date: Mar. 24, 2016

(65) Prior Publication Data
US 2017/0250417 A1      Aug. 31, 2017

(51) Int. Cl.
*H01M 8/04228* (2016.01)
*H01M 8/04223* (2016.01)
(Continued)

(52) U.S. Cl.
CPC ... *H01M 8/04228* (2016.02); *H01M 8/04238* (2013.01); *H01M 8/188* (2013.01);
(Continued)

(58) Field of Classification Search
CPC ................................................. H01M 8/04228
See application file for complete search history.

(56) References Cited

U.S. PATENT DOCUMENTS

| | | |
|---|---|---|
| 5,318,865 A | 6/1994 | Kaneko et al. |
| 5,648,184 A | 7/1997 | Inoue et al. |
| | (Continued) | |

FOREIGN PATENT DOCUMENTS

| | | |
|---|---|---|
| JP | S54-19228 | 7/1979 |
| JP | H02-148659 | 6/1990 |
| | (Continued) | |

OTHER PUBLICATIONS

TranslationWO2016/050598 (Year: 2019).*
(Continued)

*Primary Examiner* — Brian R OHara
(74) *Attorney, Agent, or Firm* — Carlson, Gaskey & Olds, P.C.

(57) ABSTRACT

A method is disclosed for regenerating an electrode of a flow battery. The method can be executed during shutdown of the flow battery from an active charge/discharge mode to an inactive, shut-down mode in which neither a negative electrolyte nor a positive electrolyte are circulated through at least one cell of the flow battery. The method includes driving voltage of the least one cell of the flow battery toward zero by converting, in-situ, the negative electrolyte in the at least one cell to a higher oxidation state. The negative electrolyte is in contact with an electrode of the at least one cell. The higher oxidation state negative electrolyte is used to regenerate, in-situ, catalytically active surfaces of the electrode of the at least one cell.

26 Claims, 1 Drawing Sheet

(51) Int. Cl.
H01M 8/18 (2006.01)
H01M 8/20 (2006.01)
H01M 4/90 (2006.01)

(52) U.S. Cl.
CPC ............ *H01M 8/20* (2013.01); *H01M 4/9016* (2013.01); *H01M 2250/10* (2013.01); *Y02B 90/14* (2013.01); *Y02E 60/528* (2013.01)

(56) References Cited

U.S. PATENT DOCUMENTS

| | | | |
|---|---|---|---|
| 6,309,532 | B1 | 10/2001 | Tran et al. |
| 9,166,243 | B2 | 10/2015 | Perry |
| 2008/0274393 | A1 | 11/2008 | Markoski et al. |
| 2008/0292938 | A1 | 11/2008 | Perry et al. |
| 2009/0136789 | A1 | 5/2009 | Pien et al. |
| 2012/0183872 | A1* | 7/2012 | Keshavarz ........ H01M 8/04223 429/429 |
| 2014/0186731 | A1* | 7/2014 | Pham ................ H01M 8/04186 429/429 |

FOREIGN PATENT DOCUMENTS

| | | | |
|---|---|---|---|
| JP | 2006-156029 | 6/2006 | |
| JP | 2006313691 | 11/2006 | |
| JP | 2012164530 | 8/2012 | |
| WO | 2013095374 | 6/2013 | |
| WO | 2013131838 | 9/2013 | |
| WO | 2014088601 | 6/2014 | |
| WO | 2014098917 | 6/2014 | |
| WO | WO-2016050598 A1 * | 4/2016 | ............ H01M 8/188 |

OTHER PUBLICATIONS

International Search Report & Written Opinion for International Application No. PCT/US2014/055565 completed Nov. 18, 2014.
Extended European Search Report for European Patent Application No. 14902061.2 dated May 23, 2017.
International Preliminary Report on Patentability for International Patent Application No. PCT/US2014/055565 dated Mar. 21, 2017.
File History for U.S. Appl. No. 13/513,651 now U.S. Pat. No. 9,166,243 issued Oct. 20, 2015.
Certified Translation. Japanese Publication of Examined Patent Application No. S52-102887 published Jul. 13, 1979.
Certified Translation. Japanese Unexamined Patent Application No. H2-148659 published Jun. 7, 1990.
Certified Translation. Japanese Unexamined Patent Application No. 2006-156029 published Jun. 15, 1990.
Linden, D. and Reddy, T.B. Eds. (2002). Handbook of batteries. New York, NY: McGraw-Hill. pp. 37.12, 18-23, 42.3-13, 43.11-3, Appendix A.
Laramini, J. and Dicks, A. (2003). Fuel cell systems explained. Chichester, England: John Wiley & Sons Inc. pp. xv, xvi, 18-9, 88-9, 94-6.
Haar, D. (2016). Dan Haar: United Technologies battery could upend the power business. Hartford Courant. Retrieved Feb. 22, 2017 from: http://www.courant.com/business/dan-haar/hc-haar-united-technologies-battery-for-electric-grid-20160523-column.html.
Aricò, A.S., Creti, P., Baglio, V., Modica, E., and Antonucci, V. (2000). Influence of flow field design on the performance of a direct methanol fuel cell. Journal of Power Sources vol. 91. 2000. pp. 202-9.
Li, X. and Sabir, I. (2004). Review of bipolar plates in PEM fuel cells: Flow-field designs. International Journal of Hydrogen Energy vol. 30. 2005. pp. 359-71.
Negishi, A. (2003). Redox flow battery. (Certified Translation). Fuel Cells vol. 2(4). 2003. pp. 69-74.
Yi, J.S., and Nguyen T.V. (1996). Abstract: Hydrodynamics of reactant gas in the electrode of PEM fuel cells with inter-digitated flow fields. The Electrochemical Society, Inc. Meeting Abstracts. Fall Meeting, San Antonio, TX. Oct. 6-11, 1996. p. 974-6.
Kazim, A., Liu, H.T., and Forges, P. (1999). Modelling of performance of PEM fuel cells with conventional and interdigitated flow fields. Journal of Applied Electrochemistry vol. 29(12). 1999. pp. 1409-16.
Wang, L. and Liu, H. (2004). Performance studies of PEM fuel cells with interdigitated flow fields. Journal of Power Sources vol. 13(2). 2004. pp. 185-96.
Guo, S.M. (2005). The simulation of a PEMFC with an interdigitated flow field design. Computational Science 5th International Conference. May 2005. pp. 104-111.
He, W., Yi, J.S., Nguyen, T.V. (2000). Two-phase flow model of the cathode of PEM fuel ceels using interdigitated flow fields. AIChE Journal vol. 46(10). Oct. 2000. pp. 2053-64.
Nozaki, K., Hamamoto, O., Kaneko, H., and Ozawa, T. (1975). (Certified Translation). Prospect of power storage using redox flow type secondary battery. Electrochemical/Electro-thermal Study Group Material. The Institute of Electrical Engineers of Japan. Nov. 28, 1975. pp. 1-16.
Declaration of Dr. Toru Kato, Ph.D. In re U.S. Appl. No. 9,166,243. Executed Feb. 23, 2017. pp. 1-89.
Prior Art Claim Chart for U.S. Pat. No. 9,166,243.
Ponce de León, C., Frías-Ferrer, A., González-García, Szánto, D.A., and Walsh, F.C. (2006). Redox flow cells for energy conversion. Journal of Power Sources vol. 160. 2006. pp. 716-32.
Negishi, A. (2003). Redox flow battery. Fuel Cells vol. 2(4). 2003. pp. 69-74.
Nozaki, K., Hamamoto, O., Kaneko, H., and Ozawa, T. (1975). Prospect of power storage using redox flow type secondary battery. Electrochemical/Electro-thermal Study Group Material. The Institute of Electrical Engineers of Japan. Nov. 28, 1975. pp. 1-16.
Shigematsu, T. (2011). Redox flow battery for energy storage. SEI Technical Review No. 73. Oct. 2011. pp. 4-13.
Tokuda, N., Kanno, T., Hara, T., Shigematsu, T., Tsutsui, Y., Ikeuchi, A., Itou, T., et al. (2000). Development of a redox flow battery system. SEI Technical Review No. 73. Jun. 2000. pp. 88-94.
Hagedorn, N.H. (1984). NASA redox storage system development project. Final Report. DOE/NASA/12726-24. Oct. 1984. pp. 1-43.
Sumitomo Electric. Redox Flow Battery. Technical Document. Retrieved May 8, 2017 from: http://global-sei.com/products/redox/pdf/redox-flow-battery.pdf.
Petition for Inter Partes Review of U.S. Pat. No. 9,166,243. *Sumitomo Electric Industries, Ltd.*, Petitioner, v. *United Technologies Corporation*, Patent Owner. Filed Feb. 23, 2017.

\* cited by examiner

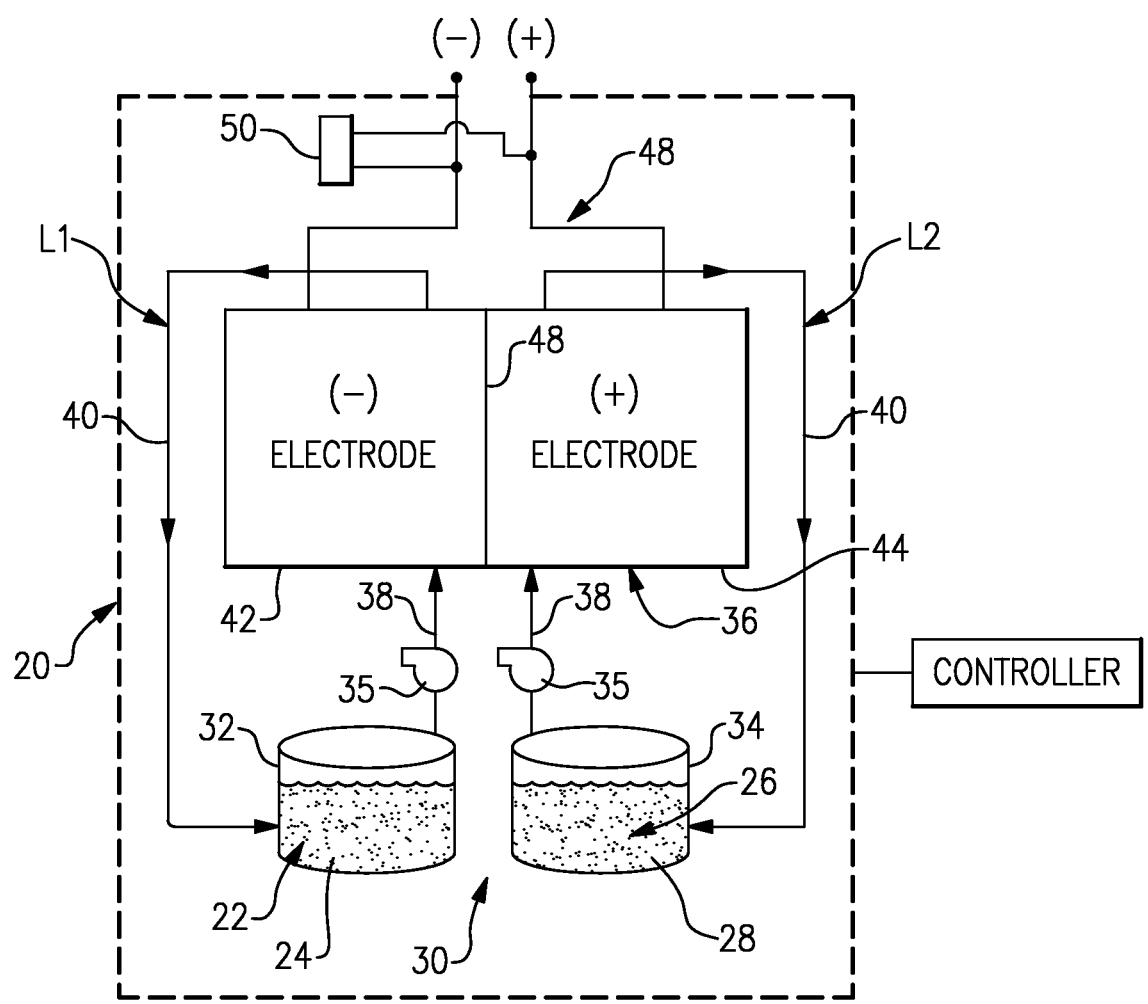

REGENERATION OF FLOW BATTERY ELECTRODE

BACKGROUND

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A typical flow battery includes a redox flow cell that has a negative electrode and a positive electrode separated by an electrolyte layer, which may include a separator, such as an ion-exchange membrane. A negative fluid electrolyte (sometimes referred to as the anolyte) is delivered to the negative electrode and a positive fluid electrolyte (sometimes referred to as the catholyte) is delivered to the positive electrode to drive electrochemically reversible redox reactions. Upon charging, the electrical energy supplied causes a chemical reduction reaction in one electrolyte and an oxidation reaction in the other electrolyte. The separator prevents the electrolytes from freely and rapidly mixing but permits selected ions to pass through to complete the redox reactions. Upon discharge, the chemical energy contained in the liquid electrolytes is released in the reverse reactions and electrical energy can be drawn from the electrodes. Flow batteries are distinguished from other electrochemical devices by, inter alia, the use of externally-supplied, fluid electrolyte solutions that include reactants that participate in reversible electrochemical reactions.

SUMMARY

A method for regenerating a carbon electrode of a flow battery according to an example of the present disclosure includes during shutdown of the flow battery from an active charge/discharge mode to an inactive, shut-down mode in which neither a negative electrolyte nor a positive electrolyte are circulated through at least one cell of the flow battery, driving voltage of the least one cell of the flow battery toward zero by converting, in-situ, the negative electrolyte in the at least one cell to a higher oxidation potential. The negative electrolyte is in contact with an electrode of the at least one cell and uses the higher potential negative electrolyte to regenerate, in-situ, the electrode of the at least one cell with respect to catalytically active surface of the electrode.

In a further embodiment of the foregoing embodiment, the catalytically active surface has oxygen-containing groups.

In a further embodiment of any of the foregoing embodiments, the driving of the voltage of at least one cell of the flow battery toward zero includes ceasing flow of the negative electrolyte through the at least one cell to the electrode and flowing a positive electrolyte through the at least one cell.

In a further embodiment of any of the foregoing embodiments, the ceasing of the flow of the negative electrolyte through the at least one cell to the electrode includes deactivating at least one pump which, when active, circulates the negative electrolyte between the at least one cell and an external storage vessel.

In a further embodiment of any of the foregoing embodiments, the flowing of the positive electrolyte through the at least one cell is periodic.

In a further embodiment of any of the foregoing embodiments, the flowing of the positive electrolyte through the at least one cell is preceded by at least partially emptying the at least one cell of the positive electrolyte.

A further embodiment of any of the foregoing embodiments includes voltage cycling the at least one cell that has the higher oxidation potential negative electrolyte to further convert the negative electrolyte in the at least one cell to the higher oxidation potential.

In a further embodiment of any of the foregoing embodiments, the voltage cycling is within a range +/−400 millivolts In a further embodiment of any of the foregoing embodiments, the voltage cycling has a cycle frequency of 10 minutes or less.

A flow battery according to an example of the present disclosure includes at least one cell including a first electrode, a second electrode spaced apart from the first electrode, and an electrolyte separator layer arranged between the first electrode and the second electrode. A supply/storage system external of the at least one cell includes a first vessel fluidly connected in a first loop with the first electrode, a second vessel fluidly connected in a second loop with the second electrode. The first loop and the second loop are isolated from each other with respect to open fluid flow there between. A controller is configured to regenerate catalytically active surfaces of one of the first electrode or the second electrode during shutdown of the flow battery from an active charge/discharge mode to an inactive, shut-down mode in which neither a negative electrolyte nor a positive electrolyte are circulated through the at least one cell, by driving voltage of the least one cell toward zero by converting, in-situ, the negative electrolyte in the at least one cell to a higher oxidation state. The negative electrolyte is in contact with one of the first electrode or the second electrode, and uses the higher oxidation state negative electrolyte to regenerate, in-situ, the catalytically active surfaces of the electrode.

In a further embodiment of any of the foregoing embodiments, the driving of the voltage of at least one cell of the flow battery toward zero includes ceasing flow of the negative electrolyte through the at least one cell to the electrode and flowing a positive electrolyte through the at least one cell.

In a further embodiment of any of the foregoing embodiments, the ceasing of the flow of the negative electrolyte through the at least one cell to the electrode includes deactivating at least one pump which, when active, circulates the negative electrolyte in either the first loop or the second loop.

In a further embodiment of any of the foregoing embodiments, the flowing of the positive electrolyte through the at least one cell is periodic.

In a further embodiment of any of the foregoing embodiments, the flowing of the positive electrolyte through the at least one cell is preceded by at least partially emptying the at least one cell of the positive electrolyte.

In a further embodiment of any of the foregoing embodiments, the controller is configured to voltage cycle the at least one cell that has the higher oxidation state negative electrolyte to further convert the negative electrolyte in the at least one cell to the higher state of charge.

In a further embodiment of any of the foregoing embodiments, the voltage cycling is within a range +/−400 millivolts In a further embodiment of any of the foregoing embodiments, the voltage cycling has a cycle frequency of 10 minutes or less.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example flow battery that has a controller that is configured to execute a method for regenerating an electrode of the flow battery.

DETAILED DESCRIPTION

FIG. 1 schematically shows portions of an example flow battery 20 for selectively storing and discharging electrical energy. As an example, the flow battery 20 can be used to convert electrical energy generated in a renewable energy system to chemical energy that is stored until a later time when there is greater demand, at which time the flow battery 20 can be used to convert the chemical energy back into electrical energy. The flow battery 20 can supply the electric energy to an electric grid, for example. As will be described, the disclosed flow battery 20 includes features for enhanced durability with respect to maintaining high cell performance through in-situ regeneration of carbon electrodes.

The flow battery 20 includes a fluid electrolyte 22 that has at least one electrochemically active species 24 that functions in a redox pair with regard to an additional fluid electrolyte 26 that has at least one electrochemically active species 28. For example, the electrochemically active species 24/28 are based on vanadium or iron. The electrochemically active species 24/28 can include ions of elements that have multiple, reversible oxidation states in a selected liquid solution, such as but not limited to, aqueous solutions or dilute aqueous acids, such as 1-5M sulfuric acid. In some examples, the multiple oxidation states are non-zero oxidation states, such as for transition metals including but not limited to vanadium, iron, manganese, chromium, zinc, molybdenum and combinations thereof, and other elements including but not limited to sulfur, cerium, lead, tin, titanium, germanium and combinations thereof. In some examples, the multiple oxidation states can include the zero oxidation state if the element is readily soluble in the selected liquid solution in the zero oxidation state. Such elements can include the halogens, such as bromine, chlorine, and combinations thereof. The electrochemically active species 24/28 could also be organic molecules that contain groups that undergo electrochemically reversible reactions, such as quinones. In embodiments, the fluid electrolytes 22 and 26 are solutions that include one or more of the electrochemically active species 24/28. The first fluid electrolyte 22 (e.g., the negative electrolyte) and the second fluid electrolyte 26 (e.g., the positive electrolyte) are contained in a supply/storage system 30 that includes first and second vessels 32/34.

The fluid electrolytes 22/26 are circulated by pumps 35 to at least one cell 36 of the flow battery 20 through respective feed lines 38, and are returned from the cell 36 to the vessels 32/34 via return lines 40. As can be appreciated, additional pumps 35 can be used if needed, as well as valves (not shown) at the inlets/outlets of the components of the flow battery 20 to control flow. The feed lines 38 and the return lines 40 connect the vessels 32/34 in respective loops L1/L2 with first and second electrodes 42/44. Multiple cells 36 can be provided as a stack within the loops L1/L2.

The cell or cells 36 each include the first electrode 42, the second electrode 44 spaced apart from the first electrode 42, and an electrolyte separator layer 46 arranged between the first electrode 42 and the second electrode 44. For example, the electrodes 42/44 are porous carbon structures, such as carbon paper or felt. The electrodes may also contain additional materials which are catalytically-active, for example a metal oxide. In general, the cell or cells 36 can include bipolar plates, manifolds and the like for delivering the fluid electrolytes 22/26 through flow field channels to the electrodes 42/44. It is to be understood however, that other configurations can be used. For example, the cell or cells 36 can alternatively be configured for flow-through operation where the fluid electrolytes 22/26 are pumped directly into the electrodes 42/44 without the use of flow field channels.

The electrolyte separator layer 46 can be, but is not limited to, an ionic-exchange membrane, a micro-porous polymer membrane or an electrically insulating microporous matrix of a material, such as silicon carbide (SiC), that prevents the fluid electrolytes 22/26 from freely and rapidly mixing but permits selected ions to pass through to complete the redox reactions while electrically isolating the electrodes 42/44. In this regard, the loops L1/L2 are isolated from each other during normal operation, such as charge, discharge and shutdown states.

The fluid electrolytes 22/26 are delivered to, and circulate through, the cell or cells 36 during an active charge/discharge mode to either convert electrical energy into chemical energy or, in the reverse reaction, convert chemical energy into electrical energy that is discharged. The electrical energy is transmitted to and from the cell or cells 36 through an electric circuit 48 that is electrically coupled with the electrodes 42/44.

The flow battery 20 can also be transitioned from the active charge/discharge mode to a fully shutdown mode in which neither of the fluid electrolytes 22/26 are circulated through the cells 36. For example, in the fully shutdown mode, the fluid electrolytes 22/26 are either emptied from the cells 36 or are left in the cells 36 but not circulated. In this regard, the flow battery 20 also includes a controller that has hardware, such as a microprocessor, software, or both that are configured to control the operation of the flow battery 20, including shutdown from the active charge/discharge mode, start-up from the inactive shutdown mode, and selective regeneration the cell or cells 36, described in further detail herein.

The catalytically-active surface species present on the negative, first electrode 42 can decay and thus debit the performance and/or reduce the life of the flow battery 20. For example, carbon-based electrodes where oxygen-containing groups on the surfaces of the first electrode 42 that normally catalyze the electrochemical reaction with the first electrochemically active species 24 can decay through chemical reduction reactions during operation of the flow battery 20 in the active charge/discharge mode. There are several factors which, especially in combination, can influence decay. Half-cell potentials at each of the electrodes 42/44 can differ during operation of the flow battery 20. The half-cell potentials can change due to changes in the relative concentrations of the active species, which will influence the half-cell potential measured at open circuit (i.e., with no current on the cell), and the half-cell potentials will vary during operation due to a variety of factors including the operating current. The difference between the half-cell potential measured during operation and the half-cell potential measured at open-circuit is herein defined as the electrode overpotential. Therefore, during the charge operation, the negative electrode experiences negative overpotentials and positive overpotentals during discharge. In particular, if the half-cell potential or the overpotential at the first electrode 42 is more negative than a threshold potential for decay then the first electrode 42 can decay. These threshold potentials will depend on the catalytically active species present on the electrode material, but a threshold half-cell potential is on the order of −400 mV$_{SHE}$ and a threshold overpotential would typically be −200 mV. While not limited to specific reactions, these electrode decay mechanisms could include such reactions as the electrochemical reduction of oxide species on the carbon electrodes that may enhance the redox reaction kinetics, which may be prone to occur at low local potentials.

Additionally, in comparison to the second fluid electrolyte 26, the active species in the negative first fluid electrolyte 22 have a higher tendency to pass through (e.g., by diffusion) the electrolyte separator layer 46 and mix into the second fluid electrolyte 26. Over time, the amount of the active species in the first fluid electrolyte 22 decreases and the amount of the second fluid electrolyte 26 increases. The decreased amount of the active species in the first fluid electrolyte 22 available locally at the first electrode 42 thus becomes a limiting factor in the overall electrochemical reaction. This promotes a more negative overpotential at the first electrode. When the half-cell potential at the first electrode 42 or the overpotential is more negative than the threshold overpotential, the decay reactions can occur. As described in more detail below, the flow battery 20 includes features for in-situ regeneration of the catalytically-active species present on the first electrode 42 by increasing the potential at the negative electrodes to more positive potentials.

In one example, the controller is operable to selectively execute a method for regenerating the catalytically active species of the first electrode 42. The "selective" execution of the method refers to an ability of the controller to be programmed to execute the method in dependence on one or more factors that may be indicative of decay or a threshold level of decay. For example, such factors can include, but are not limited to, time, cycles of charge/discharge, an event associated with causing decay, or combinations thereof.

The method is executed during transition of the flow battery 20 from the active charge/discharge mode to the inactive, shut-down mode. For example, the method is conducted prior to fully emptying or filling the cell or cells 36 of both of the fluid electrolytes 22/26, although in some examples the second fluid electrolyte (e.g., the positive electrolyte) can be fully or partially emptied in advance of, or as part of, the regeneration process.

The method includes driving voltage of the cell or cells 36 of the flow battery 20 toward zero by converting, in-situ, the active species in the non-circulating first fluid electrolyte 22 (e.g., the negative electrolyte) in the cell or cells 36 to species with a higher oxidation potential. The first fluid electrolyte 22 (e.g., the negative electrolyte) is in contact with the carbon of the first electrode 42, which has at least some decay. The higher oxidation potential of the first fluid electrolyte 22 is then used to regenerate, in-situ, the catalytically-active species of the first electrode 42. For example, on a carbon-only electrode where oxygen-containing species are the catalytically-active species, these oxygen-containing species can be regenerated on the carbon surface with sufficiently high positive potentials. That is, negative electrolyte which has been converted to a higher oxidation potential serves as an oxidizer to oxidize the carbon surfaces and increase the number of oxygen-containing groups.

The zero voltage is the cell voltage differential between the electrodes 42/44. For example, although the cell voltage differential may be zero or near zero, the half-cell potentials of each electrode 42/44, relative to a reference, may not be zero. For example, in the flow battery 20, at a cell voltage differential of zero or near zero, the half-cell potentials may be 1 V$_{SHE}$, or greater. As used herein, the cell voltage differential of zero includes differentials of less than 400 mV and preferably less than 200 mV$_{[MLP1]}$ per each cell 36.

The conversion of the first fluid electrolyte 22 in the cell or cells 36 to a higher oxidation potential may be achieved through electrolyte crossover through the separator 46. In one example based on vanadium for the fluid electrolyte 22/26, the fully balanced average oxidation state is +3.5 based upon the use of $V^{2+}/V^{3+}$ and $V^{4+}/V^{5+}$ (which can also be denoted as V(ii)/V(iii) and V(iv)/V(v), although the valences of the vanadium species with oxidation states of 4 and 5 are not necessarily 4+ and 5+) as the electrochemically active species 24/28. For example, if the electrolyte solution is aqueous sulfuric acid, then the V(iv)/V(v) species will be present as $VO^{2+}$ and $VO_2^+$, respectively.

To drive the voltage toward zero, the controller ceases flow of the first fluid electrolyte 22 through the cell or cells 36 and circulates (i.e. flows) the second fluid electrolyte 26 (e.g., the positive electrolyte) through the cell or cells 36. To cease flow of the first fluid electrolyte 22, the controller deactivates the pump 35 of loop L1, while the pump of loop L2 remains active, or is activated, to circulate the second fluid electrolyte 26. Through electrolyte crossover through the separator 46, the first fluid electrolyte 22 is driven, i.e., converted, toward an equilibrium where the oxidation potential is similar to the positive (second fluid 26) electrolyte. The circulation of the second fluid electrolyte 26 facilitates driving the conversion at a higher rate, to reduce the time of the regeneration process. Thus, the V(ii)/V(iii) of the first fluid electrolyte 22 is driven toward V(iv)/V(v), and preferably toward V(v), for stronger oxidizing effect.

In a further example, while the flow of the first fluid electrolyte 22 is stopped and flow of the second fluid electrolyte 26 through the cell or cells 36 is continued, the external electric circuit 48 can be closed to allow current to flow. The external circuit can be shorted or a constant or variable resistor or load can be used to obtain the current desired, which is essentially the same as discharging the battery during normal operation. Alternatively, a constant current or constant voltage can be applied by the controller. This external discharge current will cause the negative electrochemically active species 24 to oxidize and thereby decrease the time required for the first fluid electrolyte 22 remaining in the cells to be driven towards the desired higher oxidation potential state. In a further example, the flow of the second fluid electrolyte 26 through the cell or cells 36 is periodic. For example, the controller pulses the pump 35 of loop L2 in a periodic manner. The pulsing of the pump 35 reduces overall energy consumption, for example.

In a further example, prior to circulating the second fluid electrolyte 26 through the cell or cells 36, the controller at least partially empties or drains the cell or cells 36 of the second fluid electrolyte 26. Thus, fully, or substantially fully charged (with respect to state of charge) second fluid electrolyte 26 can be circulated through the cell or cells 36 for the regeneration. The fully or substantially fully charged second fluid electrolyte 26 facilitates driving the first fluid electrolyte 22 to the highest oxidation potential for a stronger oxidizing effect.

In further examples, the first fluid electrolyte 22 can be further converted in a boost process to more positive potentials using an external bi-directional power supply 50. During the boost process the controller deactivates the pumps 35. At least the pump 35 of loop L1 may already be deactivated from the above-described examples. The controller, through the external power supply 50, applies a cyclic voltage to the cell or cells 36. For example, the voltage cycling is within a range +/−400 millivolts or, in a further example, within a range of +/−200 millivolts. Higher voltages can cause detrimental side reactions with the carbon, such as conversion of the carbon to carbon dioxide, or cause the electrolysis of water in the system. For example, carbon reacts to form carbon dioxide at voltages above 0.4 $V_{SHE}$, although the rate of this reaction is slow. At voltages above approximately 1.2 $V_{SHE}$, electrolysis of water can occur.

In a further example, the cycling is relatively rapid and can be conducted at a cycle frequency of 10 minutes or less or 1 minute or less. The cycling is considered rapid with respect to the normal voltage cycles that the cell or cells 36 would experience from cycling between the active and inactive modes. The cycling inputs additional electric current into the system to further drive the first fluid electrolyte 22 to the higher or highest oxidation potentials possible and thus promote further or more rapid oxidation (regeneration) of the catalytically active species on the first electrode 42.

Although a combination of features is shown in the illustrated examples, not all of them need to be combined to realize the benefits of various embodiments of this disclosure. In other words, a system designed according to an embodiment of this disclosure will not necessarily include all of the features shown in any one of the FIGURE or all of the portions schematically shown in the FIGURE. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method for regenerating an electrode of a flow battery, the method comprising:
during a transition of the flow battery from an active charge/discharge mode to an inactive, shut-down mode in which neither a negative electrolyte nor a positive electrolyte are circulated through at least one cell of the flow battery, driving voltage of the least one cell of the flow battery toward zero by converting, in-situ, the negative electrolyte in the at least one cell to a higher oxidation potential, the negative electrolyte in contact with an electrode of the at least one cell; and
using the higher potential negative electrolyte to regenerate, in-situ, the electrode of the at least one cell with respect to a catalytically active surface of the electrode, followed by transitioning the flow batter into the shut-down mode.

2. The method as recited in claim 1, wherein the catalytically active surface is carbon that has oxygen-containing groups.

3. The method as recited in claim 1, wherein the driving of the voltage of at least one cell of the flow battery toward zero includes ceasing flow of the negative electrolyte through the at least one cell to the electrode and flowing the positive electrolyte through the at least one cell.

4. The method as recited in claim 3, wherein the ceasing of the flow of the negative electrolyte through the at least one cell to the electrode includes deactivating at least one pump which, when active, circulates the negative electrolyte between the at least one cell and an external storage vessel.

5. The method as recited in claim 3, wherein the flowing of the positive electrolyte through the at least one cell is periodic.

6. The method as recited in claim 3, wherein the flowing of the positive electrolyte through the at least one cell is preceded by at least partially emptying the at least one cell of the positive electrolyte.

7. The method as recited in claim 1, further comprising voltage cycling the at least one cell that has the higher oxidation potential negative electrolyte to further convert the negative electrolyte in the at least one cell to the higher oxidation potential.

8. The method as recited in claim 7, wherein the voltage cycling is within a range of −400 millivolts to +400 millivolts.

9. The method as recited in claim 8, wherein the voltage cycling has a cycle frequency of 10 minutes or less.

10. The method as recited in claim 1, further comprising applying an external discharge current to the at least one cell that has the higher oxidation potential negative electrolyte to further convert the negative electrolyte in the at least one cell to the higher oxidation potential.

11. A flow battery comprising:
at least one cell including a first electrode, a second electrode spaced apart from the first electrode, and an electrolyte separator layer arranged between the first electrode and the second electrode;
a supply/storage system external of the at least one cell and including:
a first vessel fluidly connected in a first loop with the first electrode,
a second vessel fluidly connected in a second loop with the second electrode, the first loop and the second loop being isolated from each other with respect to open fluid flow there between; and
a controller that is configured to regenerate catalytically active surfaces of one of the first electrode or the second electrode during a transition of the flow battery from an active charge/discharge mode to an inactive, shut-down mode in which neither a negative electrolyte nor a positive electrolyte are circulated through the at least one cell, by driving voltage of the least one cell toward zero by converting, in-situ, the negative electrolyte in the at least one cell to a higher oxidation state, the negative electrolyte in contact with one of the first electrode or the second electrode, and using the higher oxidation state negative electrolyte to regenerate, in-situ, the catalytically active surfaces of the electrode, followed by transitioning the flow batter into the shut-down mode.

12. The flow battery as recited in claim 11, wherein the driving of the voltage of at least one cell of the flow battery toward zero includes ceasing flow of the negative electrolyte through the at least one cell to the electrode and flowing the positive electrolyte through the at least one cell.

13. The flow battery as recited in claim 12, wherein the ceasing of the flow of the negative electrolyte through the at least one cell to the electrode includes deactivating at least one pump which, when active, circulates the negative electrolyte in either the first loop or the second loop.

14. The flow battery as recited in claim 12, wherein the flowing of the positive electrolyte through the at least one cell is periodic.

15. The flow battery as recited in claim 12, wherein the flowing of the positive electrolyte through the at least one cell is preceded by at least partially emptying the at least one cell of the positive electrolyte.

16. The flow battery as recited in claim 11, wherein the controller is configured to voltage cycle the at least one cell that has the higher oxidation state negative electrolyte to further convert the negative electrolyte in the at least one cell to the higher state of charge.

17. The flow battery as recited in claim 16, wherein the voltage cycling is within a range of −400 millivolts to +400 millivolts.

18. The flow battery as recited in claim 17, wherein the voltage cycling has a cycle frequency of 10 minutes or less.

19. The flow battery as recited in claim 11, wherein the controller is configured to apply an external discharge current to the at least one cell that has the higher oxidation state negative electrolyte to further convert the negative electrolyte in the at least one cell to the higher state of charge.

20. The method as recited in claim 1, wherein the transitioning of the flow battery to the shut-down mode after the regeneration of the negative electrolyte includes, without an intervening charge/discharge cycle of the flow battery, deactivating pumps which when active circulate the negative electrolyte and the positive electrolyte between the at least one cell and external storage vessels.

21. The method as recited in claim 20, wherein the driving of the voltage of at least one cell of the flow battery toward zero includes ceasing flow of the negative electrolyte through the at least one cell to the electrode and flowing the positive electrolyte through the at least one cell.

22. The method as recited in claim 21, wherein the catalytically active surface of the electrode is carbon that has oxygen-containing groups, and the higher potential negative electrolyte regenerates the electrode by oxidizing the carbon and increase the number of oxygen-containing groups.

23. The method as recited in claim 22, wherein the positive electrolyte and the negative electrolyte are based on vanadium.

24. The method as recited in 23, wherein the flowing of the positive electrolyte through the at least one cell is periodic.

25. The method as recited in claim 23, wherein the driving of the voltage of at least one cell of the flow battery toward zero further includes at least partially emptying the at least one cell of the positive electrolyte prior to the flowing of the positive electrolyte through the at least one cell, without an intervening charge/discharge cycle of the flow battery.

26. The method as recited in claim 23, wherein the driving of the voltage of at least one cell of the flow battery toward zero further includes emptying the at least one cell of the positive electrolyte prior to the flowing of the positive electrolyte through the at least one cell, without an intervening charge/discharge cycle of the flow battery.

* * * * *